United States Patent
Satish (10) Patent No.: US 8,626,675 B1
(45) Date of Patent: Jan. 7, 2014

(54) SYSTEMS AND METHODS FOR USER-SPECIFIC TUNING OF CLASSIFICATION HEURISTICS

(75) Inventor: Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 593 days.

(21) Appl. No.: 12/559,943

(22) Filed: Sep. 15, 2009

(51) Int. Cl.
*G06F 15/18* (2006.01)

(52) U.S. Cl.
USPC .......................................................... 706/12

(58) Field of Classification Search
USPC .......................................................... 706/12
See application file for complete search history.

(56) References Cited

U.S. PATENT DOCUMENTS

| | | | |
|---|---|---|---|
| 7,555,621 B1 * | 6/2009 | Pavlyushchik | 711/162 |
| 2004/0128355 A1 * | 7/2004 | Chao et al. | 709/206 |
| 2006/0015563 A1 * | 1/2006 | Judge et al. | 709/206 |
| 2008/0162384 A1 * | 7/2008 | Kleist et al. | 706/12 |
| 2009/0187992 A1 * | 7/2009 | Poston | 726/24 |
| 2009/0254970 A1 * | 10/2009 | Agarwal et al. | 726/1 |
| 2010/0313035 A1 * | 12/2010 | Turbin et al. | 713/189 |

OTHER PUBLICATIONS

Removing web spam links from search engine results Manuel Egele Clemens Kolbitsch Christian Platzer Received: Dec. 22, 2008 / Accepted: Aug. 3, 2009 © Springer-Verlag France 2009.*

* cited by examiner

*Primary Examiner* — Kakali Chaki
*Assistant Examiner* — Ababacar Seck
(74) *Attorney, Agent, or Firm* — ALG Intellectual Property, LLC (57) ABSTRACT

A computer-implemented method for user-specific tuning of classification heuristics may include: 1) identifying a trusted software component on the computing device that has been excluded from analysis by a classification heuristic, 2) applying the classification heuristic to the trusted software component, 3) determining that the classification heuristic incorrectly classified the trusted software component, and then 4) lowering a confidence score associated with the classification heuristic.

20 Claims, 6 Drawing Sheets

SYSTEMS AND METHODS FOR USER-SPECIFIC TUNING OF CLASSIFICATION HEURISTICS

BACKGROUND

Decision trees and other heuristics are commonly used as predictive models to map observations about an item with conclusions about the item's target value. For example, a security-software vendor may use decision trees as predictive models for identifying malicious computer files ("malware") based on attributes, characteristics, and/or behaviors of files.

Decision trees and other heuristics may be trained and refined using a corpus of known samples. For example, a security-software vendor may train a malware-detection heuristic by applying and refining the heuristic using a corpus of samples containing known-malicious files and known-legitimate files. In order to maximize the accuracy and efficacy of such heuristics across large user bases, security-software vendors typically form these training corpuses using files and other software components that are prevalent within their user bases.

Unfortunately, because the accuracy of a heuristic is generally limited by the size of the corpus of samples used to train the heuristic, such heuristics may generate false positives upon being deployed and used on end users' machines in the real world. For example, a malware-detection heuristic may falsely classify legitimate administrative utilities (such as network-traffic monitoring tools or the like) on the machine of an IT security analyst if these tools exhibit behaviors and/or attributes that are closely related to behaviors and/or attributes exhibited by known-malicious software components (such as malicious sniffing tools) within the corpus of samples used to train the heuristic.

Heuristic vendors may attempt improve the accuracy of a heuristic by: 1) adding misclassified samples to the corpus of samples used to train the heuristic, 2) re-training the heuristic using the modified corpus of samples, and then 3) redeploying the re-trained heuristic. However, if a security-software vendor attempts to tune or otherwise refine a heuristic based on false positives generated on the machines of certain specific classes of end users (such as IT security analysts), the overall efficacy and/or accuracy of the heuristic may suffer with respect to the larger user base as a whole. For example, a security-software vendor may hamper a malware-detection heuristic's ability to detect malicious network sniffing components by adding legitimate network-traffic monitoring tools to a corpus of samples used to re-train the heuristic.

SUMMARY

As will be described in greater detail below, the instant disclosure generally relates to systems and methods for user-specific tuning of classification heuristics. In one example, one or more of the various systems described herein may accomplish this task by: 1) identifying at least one trusted software component (such as a digitally signed file) on an end user's computing device that has been excluded from analysis by a classification heuristic (such as a decision tree), 2) causing the end user's machine to apply the classification heuristic to the trusted software component, 3) determining whether the classification heuristic incorrectly classified the trusted software component as malicious (i.e., whether the classification heuristic produced a false positive on the trusted software component), and, if so, 4) modifying or tuning the classification heuristic by either lowering a confidence score associated with a function of the classification heuristic (such as a branch of a decision tree) that resulted in the misclassification or excluding the function that resulted in the misclassification from the classification heuristic altogether.

In one example, the trusted software component may represent a software component that would not otherwise have been scanned by the classification heuristic. For example, the trusted software component may represent a digitally signed file that would not otherwise have been analyzed by a malware-detection heuristic due its trusted status.

In some examples, the systems described herein may perform each of the above tasks in a background process or thread using free CPU cycles on the end user's machine (e.g., when the end user's machine is idle). In additions, in some examples the systems described herein may automatically allow a trusted software component to execute, even if a classification heuristic misclassifies the trusted software component as malicious. In other examples, the systems described herein may prompt a user of the computing device to allow the trusted software component to execute.

In some examples, the systems described herein may only exclude (or lower a confidence score associated with) the function of the classification heuristic that resulted in the misclassification if a confidence score associated with the classification exceeds a predetermined threshold (i.e., if the classification heuristic assigned a high confidence score to the classification, such as, e.g., 75 on a scale of 1-100). In addition, in some examples the systems described herein may: 1) identify, by tracking multiple misclassifications over time, attributes of trusted software components that result in incorrect classifications and then 2) exclude (or lower a confidence score associated with) each function of the classification heuristic that involves the identified attributes.

By applying classification heuristics to various trusted software components on end users' machines that would not otherwise have been analyzed by these heuristics, the systems and methods described herein may enable heuristic providers to analyze the accuracy of their heuristics relative to specific end users and automatically modify or tune these heuristics based on results of the same. Moreover, by modifying or tuning heuristics upon deployment on end users' machines, the systems and methods disclosed herein may enable a heuristic provider to improve the accuracy and effectiveness of the provider's heuristics without negatively impacting the overall efficacy of these heuristics relative to the provider's user base as whole.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for user-specific tuning of classification heuristics. The term "classification heuristic," or often simply "heuristic," as used herein, generally refers to any type or form of algorithm, rule, policy, formula, model, or tool that may be used to classify, or make decisions with respect to, an object or sample. In some examples, the various heuristics described herein may represent, without limitation, decision trees or other algorithms designed to detect and/or identify malware.

Figure 1:
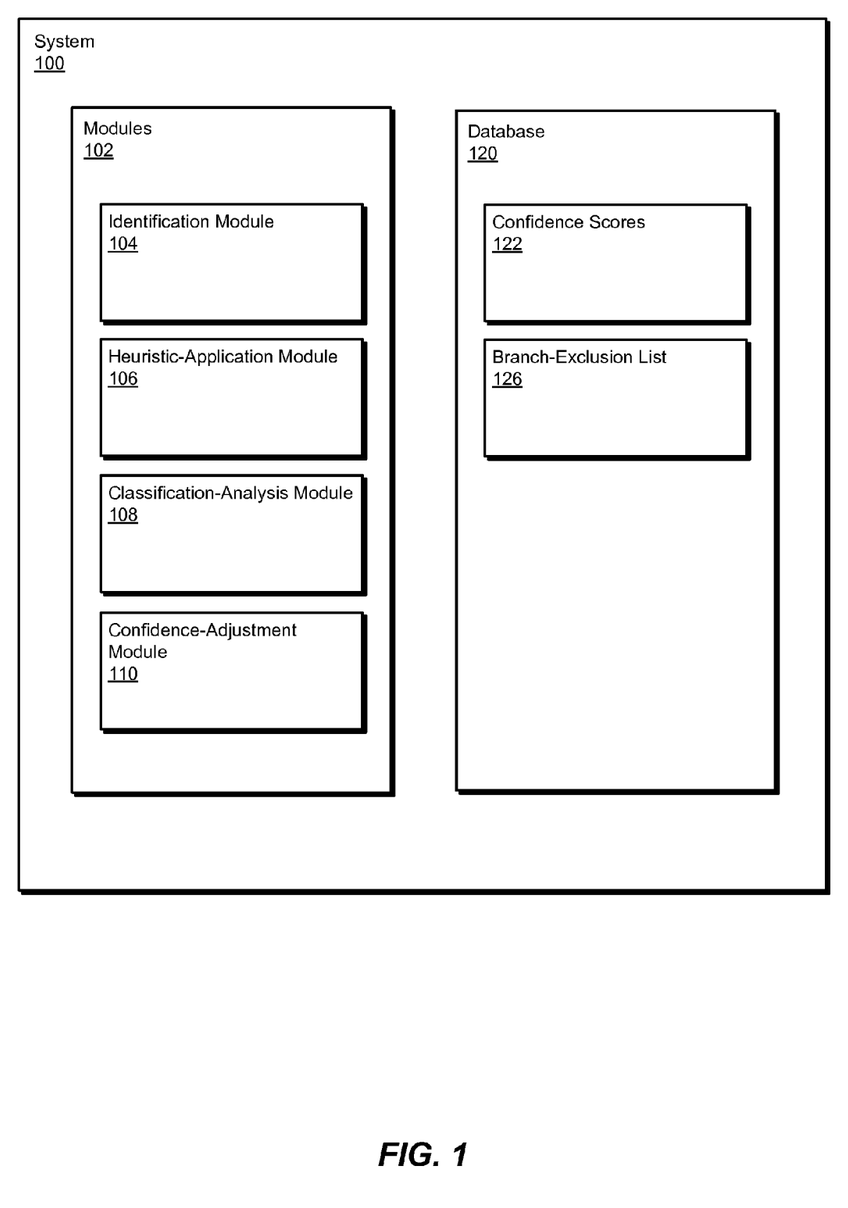
FIG. 1 is a block diagram of an exemplary system for user-specific tuning of classification heuristics.
Figure 2:
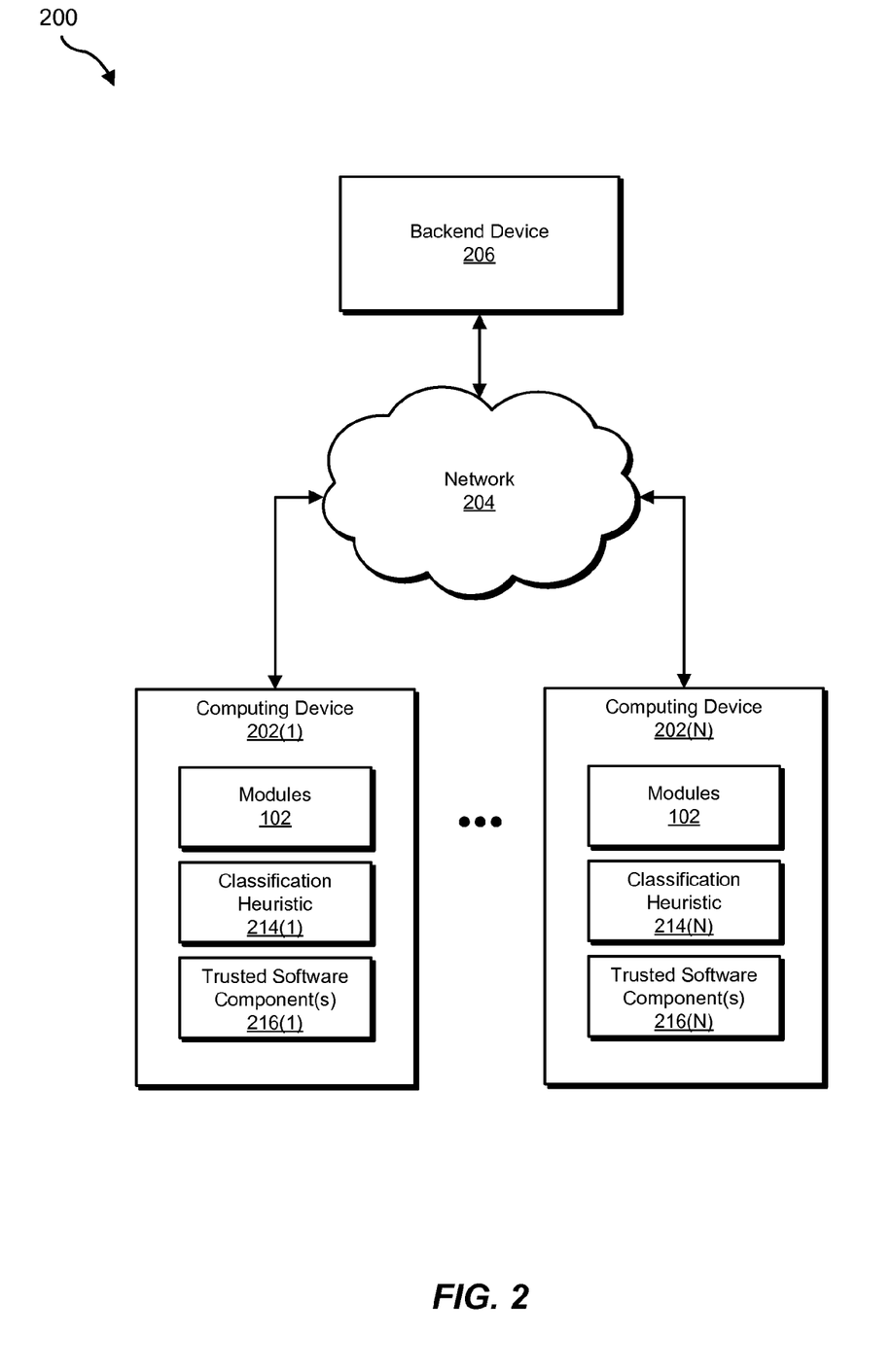
FIG. 2 is a block diagram of an exemplary system for user-specific tuning of classification heuristics.

The following will provide, with reference to FIGS. 1-2, detailed descriptions of exemplary systems for user-specific tuning of classification heuristics. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for user-specific tuning of classification heuristics. As illustrated in this figure, exemplary system 100 may include one or more modules 102 for performing one or more tasks. For example, and as will be explained in greater detail below, exemplary system 100 may include an identification module 104 programmed to identify trusted software components on end users' machines. Exemplary system 100 may also include a heuristic-application module 106 programmed to apply classification heuristics to such trusted software components.

In addition, and as will be described in greater detail below, exemplary system 100 may include a classification-analysis module 108 programmed to determine whether classification heuristics correctly classify trusted software components on end users' machines. Exemplary system 100 may also include a confidence-adjustment module 110 programmed to lower confidence scores associated with classification heuristics if these classification heuristics incorrectly classify trusted software components as malicious. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing devices 202(1)-(N) and/or backend device 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases. In one embodiment, exemplary system 100 may include a database 120 configured to store confidence scores 122 associated with classification heuristics. Database 120 may also be configured to store a branch-exclusion list 126 that identifies undesirable (e.g., false-positive prone) functions within a heuristic (such as false-positive prone decision-tree branches).

Database 120 may represent portions of a single database or computing device or a plurality of databases or computing devices. For example, database 120 may represent a portion of computing devices 202(1)-(N) and/or backend device 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as computing devices 202(1)-(N) and/or backend device 206 in FIG. 2, computing system 510 in FIG. 5, and/or portions of exemplary network architecture 600 in FIG. 6.

Exemplary system 100 in FIG. 1 may be deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a plurality of computing devices 202(1)-202(N) in communication with a backend device 206 via a network 204. In one embodiment, and as will be described in greater detail below, one or more of computing devices 202(1)-(N) may be programmed to: 1) identify a trusted software component on a computing device (such as trusted software components 216(1) on computing device 202(1) in FIG. 2), 2) apply a classification heuristic (such as classification heuristic 214(1)) to the trusted software component, 3) determine that the classification heuristic incorrectly classified the trusted software component, and then 4) modify or tune the classification heuristic by lowering a confidence score associated with the classification heuristic.

Computing devices 202(1)-(N) generally represent any type or form of computing device capable of reading computer-executable instructions. Examples of computing devices 202(1)-(N) include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Backend device 206 generally represents any type or form of server or backend configured to create and deploy heuristics to one or more computing devices, such as computing devices 202(1)-(N). In this example, computing devices 202(1)-(N) may represent all or a portion of a single community or a plurality of communities. For example, computing devices 202(1)-(N) may represent computing systems within a single or a plurality of user bases, a single or a plurality of enterprises, or portions or combinations of one or more of the same.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing devices 202(1)-(N) and backend device 206.

Figure 3:
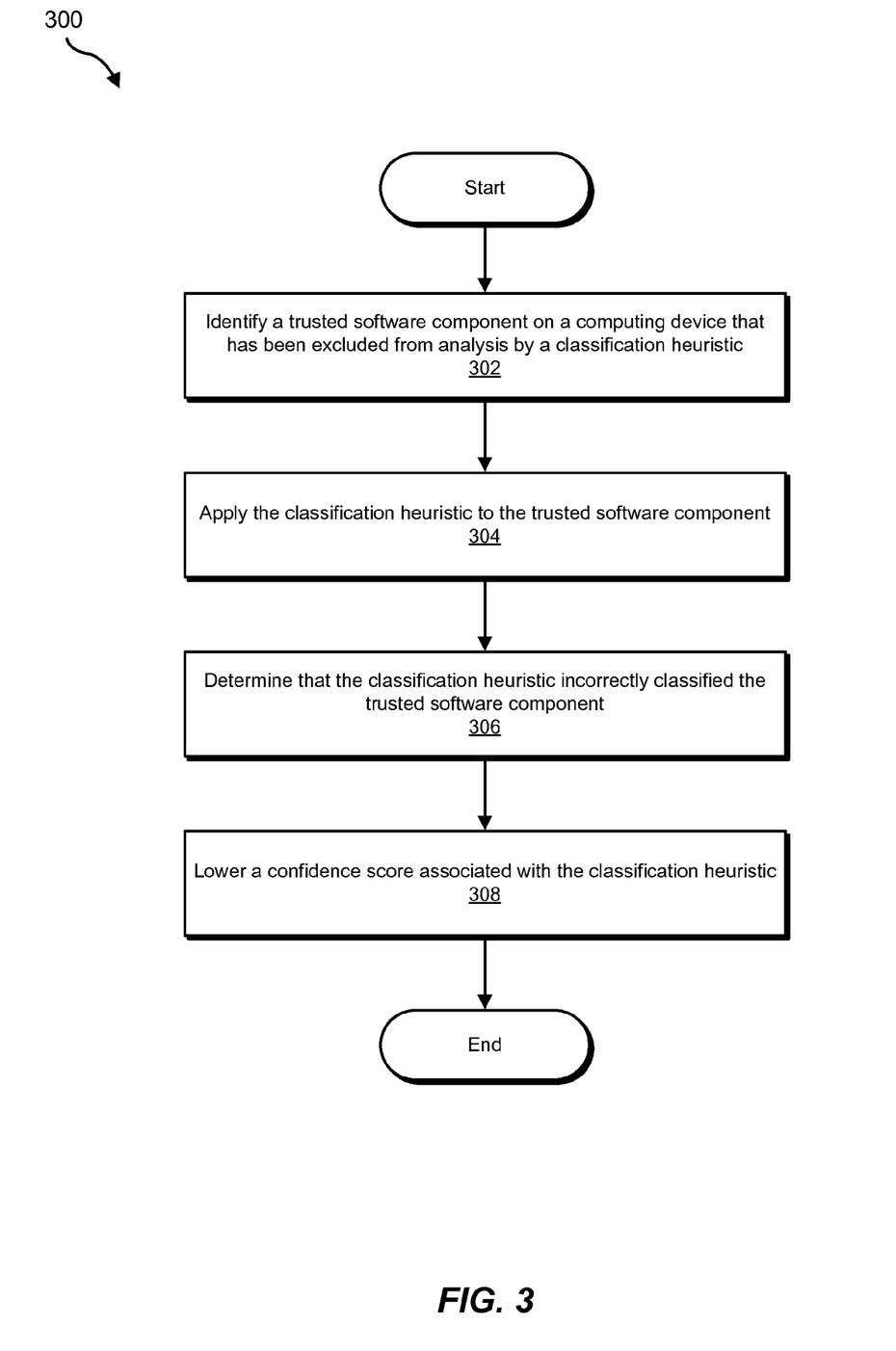
FIG. 3 is a flow diagram of an exemplary method for user-specific tuning of classification heuristics.

FIG. 3 is a flow diagram of an exemplary computer-implemented method 300 for user-specific tuning of classification heuristics. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the various systems described herein may identify a trusted software component on a computing device that has been excluded from analysis by a classification heuristic. For example, identification module 104 in FIG. 1 (which may, as detailed above, represent a portion of computing device 202(1) in FIG. 2) may identify one or more trusted software components 216(1) on computing device 202(1) that have been excluded from analysis by classification heuristic 214(1) in FIG. 2.

The term "software component," or sometimes simply "component," as used herein, may refer to a software package or file that encapsulates a set of functions or data. In some examples, a software component may also refer to a process launched by a software package or file. Examples of software components include, without limitation, files, processes, and shared objects and libraries (such as DLLs and .so files).

In addition, for purposes of this disclosure, a "trusted software component" may refer to any legitimate or valid (i.e., non-malicious) software package or file. Examples of trusted software components include, without limitation, software components that have been digitally signed by a trusted entity, software components that originate from trusted sources (e.g., trusted portals or protocols), or the like, as discussed in greater detail below.

In one example, the trusted software component may represent a software component that would not otherwise have been scanned by the classification heuristic. For example, the trusted software component may represent a digitally signed file (such as a "Class 3" signed file or a file that has been digitally signed, for example, by a trusted publisher) that would not otherwise have been analyzed by a malware-detection heuristic due its trusted status.

Identification module 104 may identify trusted software components that have been excluded from analysis by a classification heuristic in step 302 in a variety of ways. In one example, identification module 104 may scan computing device 202(1) for software components that have been digitally signed by trusted signing authorities. In another example, identification module 104 may scan computing device 202(1) for software components that have been excluded from analysis by classification 214(1) due to their trusted status. In this example, identification module 104 may identify such components by analyzing log files generated by classification heuristic 214(1).

Returning to FIG. 3, at step 304 the systems described herein may apply a classification heuristic to the trusted software component identified in step 302. For example, heuristic-application module 106 in FIG. 1 (which may, as detailed above, represent a portion of computing device 202(1) in FIG. 2) may apply classification heuristic 214(1) to one or more trusted software components 216(1) on computing device 202(1) that would not otherwise have been analyzed by classification heuristic 214(1).

As detailed above, classification heuristic 214(1) may represent any type or form of algorithm, rule, policy, formula, model, or tool that may be used to classify, or make decisions with respect to, an object or sample. In one example, and as illustrated in FIG. 4, classification heuristic 214(1) may represent a decision tree designed to detect and/or identify malware.

In one example, computing device 202(1) may receive classification heuristic 214(1) from backend device 206 in FIG. 2. As detailed above, backend device 206 may represent a server or other computing device configured to train and deploy heuristics to computing devices 202(1)-(N). In this example, computing devices 202(1)-(N) may represent computing systems within a user base or enterprise. In the context of this example, computing device 202(1) may, upon receiving classification heuristic 214(1) from backed device 206, apply classification heuristic 214(1) to one or more trusted software components 216(1) on computing device 202(1) that have been excluded from analysis by classification heuristic 214(1).

Figure 4:
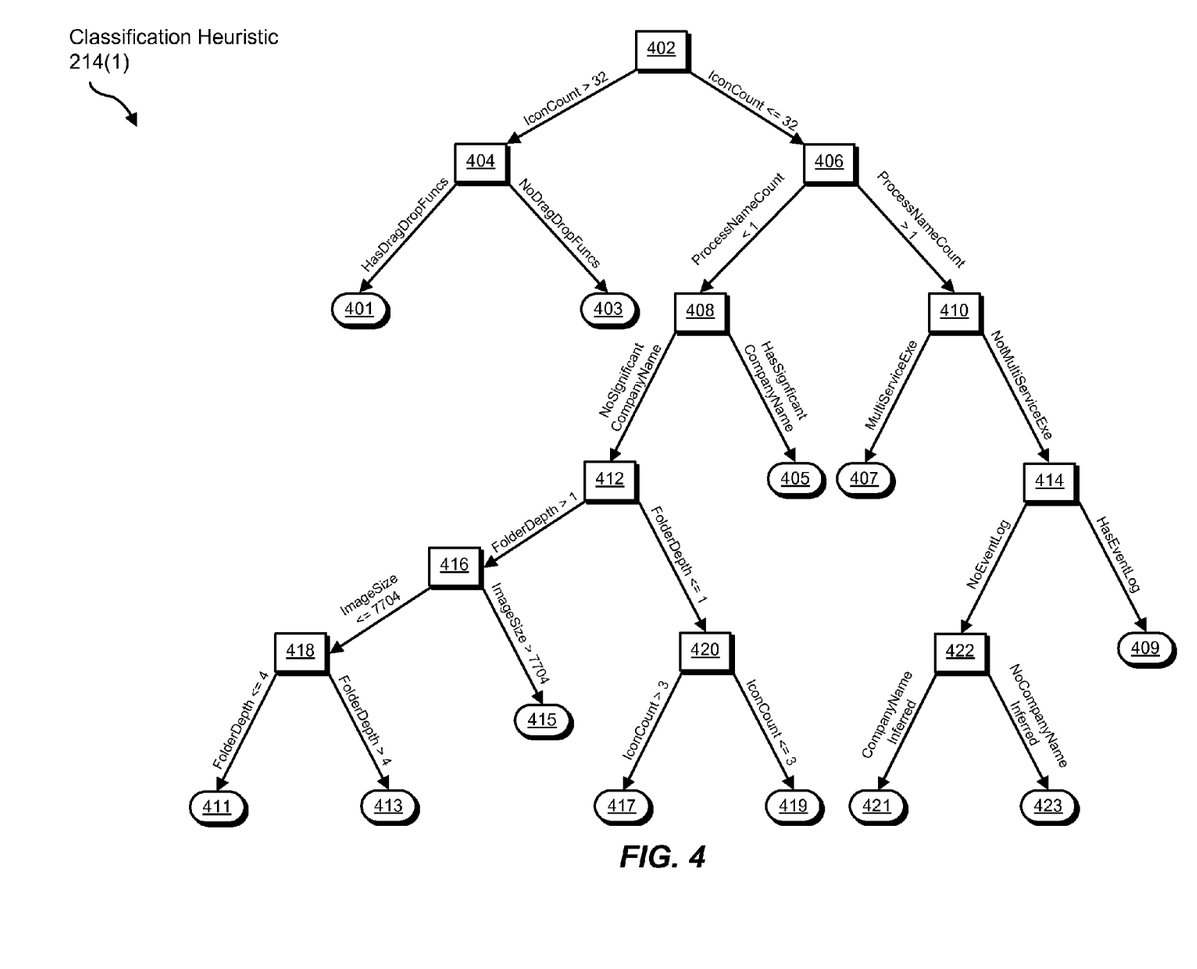
FIG. 4 is a block diagram of an exemplary classification heuristic.

For example, heuristic-application module 106 in FIG. 1 may apply classification heuristic 214(1) in FIG. 4 to one or more trusted software components 216(1) stored on computing device 202(1) that have been excluded from analysis by classification heuristic 214(1) due to their trusted status. In this example, classification heuristic 214(1) may, at decision node 402 in FIG. 4, determine whether a trusted software component (such as one or more of trusted software components 216(1) on computing device 202(1) in FIG. 2) generates more than 32 icons. If so, control may proceed along the branch "IconCount>32" to decision node 404, where classification heuristic 214(1) may determine whether the trusted software component exhibits or enables drag/drop functionality. If the trusted software component does not exhibit or enable drag/drop functionality, control may proceed along the branch "NoDragDropFuncs" to classification result 403. In this example, classification heuristic 214(1) may, at classification result 403, determine with a moderately high degree of confidence (e.g., 79 on a scale of 1-100) that the trusted software component in question represents a malicious software component.

Returning to FIG. 3, at step 306 the systems described herein may determine that the classification heuristic applied in step 304 incorrectly classified the trusted software component identified in step 302. For example, classification-analysis module 108 in FIG. 1 (which may, as detailed above, represent a portion of computing device 202(1) in FIG. 2) may determine that classification heuristic 214(1) incorrectly classified one or more trusted software components 216(1) on computing device 202(1) as malicious.

The term "classification," as used herein, may refer to decisions made with respect to a software component based on the component's characteristics, attributes, properties, behaviors, or the like. Examples of such classifications include, without limitation, classifying an executable file as malware, classifying an e-mail as spam, classifying a computing device or network-access point as compromised or untrustworthy, or the like.

Classification-analysis module 108 may determine that a classification heuristic incorrectly classified a trusted software component in step 306 in a variety of ways. For example, in the context of an antivirus system, classification-analysis module 108 may determine that classification heuristic 214(1) on computing device 202(1) incorrectly classified a trusted software component (such as a digitally signed file) as malicious (i.e., the classification represents a false positive).

Returning to FIG. 3, at step 308 the systems described herein may lower a confidence score associated with the classification heuristic applied in step 304. For example, confidence-adjustment module 110 in FIG. 1 (which may, as detailed above, represent a portion of computing device 202(1) in FIG. 2) may lower a confidence score associated with classification heuristic 214(1). Upon completion of step 308, exemplary method 300 in FIG. 3 may terminate.

Confidence scores generally represent the error-rate potential for a specific function of a heuristic (such as a branch of a decision tree), as judged by the number of training samples encountered or classified by this specific function. Confidence scores may be calculated and quantified in a variety of ways. For example, confidence scores may be calculated using normal approximation intervals, Wilson score intervals, Clopper-Pearson intervals, or any other suitable method or algorithm.

Confidence-adjust module 110 may perform step 308 in a variety of ways. In one example, confidence-adjust module 110 may: 1) identify at least one function of the classification heuristic that resulted in the incorrect classification and then 2) lower a confidence score associated with the function that resulted in the incorrect classification. For example, in the context of the decision-tree classification heuristic 214(1) illustrated in FIG. 4, confidence-adjustment module 110 may determine that the branches "IconCount>32" and "NoDragDropFuncs" in FIG. 4 incorrectly classified the trusted software component identified in step 302 as malicious. In this example, confidence-adjustment module 110 may lower a confidence score associated with the branches "IconCount>32" and/or "NoDragDropFuncs." For example, confidence-adjustment module 110 may lower a confidence score associated with the branch "NoDragDropFuncs" from 79 (on a scale of 1-100) to 12.

In the above example, the branches "IconCount>32" and/or "NoDragDropFuncs" may collectively represent a "branch configuration." The term "branch configuration," as used herein, may refer to a single branch or a sequence of two or more branches within a decision tree. For example, the single branch "HasDragDropFuncs" in exemplary decision tree 400 in FIG. 4 may represent a branch configuration resulting in classification result 401. Similarly, the sequence of branches "IconCount<=32," "ProcessNameCount<1," and "HasSignificantCompanyName" may represent a branch configuration resulting in classification result 405. Branch configurations may be order-dependent or order-independent.

In another example of step 308, confidence-adjust module 110 may: 1) identify at least one function of the classification heuristic that resulted in the incorrect classification and then 2) exclude or remove this function from the classification heuristic. For example, in the context of the decision-tree classification heuristic 214(1) illustrated in FIG. 4, confidence-adjust module 110 may add identification information (such as one or more unique identifiers) for the branch configuration that resulted in the incorrect classification to a branch-exclusion list, such as branch-exclusion list 126 in database 120 in FIG. 1. In this example, branch-exclusion list 126 may act as a blacklist that identifies undesirable (e.g., false-positive prone) branches or branch configurations in a decision tree.

The systems and methods described herein may uniquely identify functions of a heuristic (such as branch configurations of a decision tree) in a variety of ways. For example, these systems and methods may identify a function by name (e.g., by assigning a unique name to a branch configuration and/or each branch within a branch configuration), by number (e.g., by assigning a hexadecimal number to a branch configuration and/or each branch within a branch configuration), or the like. In some examples, these systems and methods may also assign unique identifiers (such as names, numbers, hashes, or the like) to trusted software components, heuristics used to classify such software components, and/or various functions within such heuristics, each of which may also be used to uniquely identify the heuristic function in question.

In some examples, the systems described herein may: 1) identify an attribute of the trusted software component identified in step 302 that resulted in the incorrect classification of step 306 and then 2) lower a confidence score associated with at least one function of the classification heuristic that involves the identified attribute. For example, if classification-analysis module 108 determines, by tracking multiple misclassifications over time, that 49 out of 50 nodes within a decision tree involving a specific attribute resulted in false positives, then classification-analysis module 108 may determine that the decision tree is unable to correctly process or analyze this specific attribute. In this example, confidence-adjustment module 110 may remove (or simply lower confidence scores associated with) branches within the decision tree that involve this specific attribute.

In some examples, the systems described herein may, upon determining that the classification heuristic incorrectly classified the trusted software component in step 306, automatically allow the trusted software component to execute. In other examples, the systems described herein may prompt a user of the computing device prior to allowing the trusted software component to execute. For example, one or more of modules 102 in FIG. 1 may, upon determining that classification heuristic 214(1) in FIG. 2 incorrectly classified one or more trusted software components 216(1) on computing device 202(1) as malicious, may prompt a user of computing device 202(1) to allow or deny execution of these trusted software components 216(1). In some examples, classification-analysis module 108 may only revisit the classification of trusted software components 216(1) if subsequent high-confidence detections are triggered by classification heuristic 214(1).

In one example, confidence-adjustment module 110 in FIG. 1 may only perform step 308 in FIG. 3 if a confidence score associated with the classification result in step 304 exceeds a predetermined threshold. For example, confidence-adjustment module 110 may only adjust a confidence score assigned to a function of a classification heuristic that resulted in an incorrect classification if the confidence score associated with this classification or function is greater than or equal to, e.g., 75 on a scale of 1-100.

In some examples, the computing device identified in step 302 may perform each step of exemplary method 300 in FIG. 3. For example, computing device 202(1) in FIG. 2 may perform steps 302, 304, 306, and 308 of FIG. 3. In other words, computing device 202(1) may modify or tune various characteristics of classification heuristic 214(1) without the aid or assistance of backend device 206 in FIG. 2.

In addition, in some embodiments each step of exemplary method 300 in FIG. 3 may be executed or performed in a low-priority background process or thread on the computing device identified in step 302. For example, one or more of modules 102 in FIG. 1 may perform one or more of the steps of exemplary method 300 in FIG. 3 using free CPU cycles on computing device 202(1) in FIG. 2. In this example, modules 102 may perform exemplary method 300 in FIG. 3 in the background so as to not unduly impact the performance of computing device 202(1).

As detailed above, by applying classification heuristics to various trusted software components on end users' machines that would not otherwise have been analyzed by these heuristics, the systems and methods described herein may enable heuristic providers to analyze the accuracy of their heuristics relative to specific end users and automatically modify or tune these heuristics based on results of the same. Moreover, by modifying or tuning heuristics upon deployment on end users' machines, the systems and methods disclosed herein may enable a heuristic provider to improve the accuracy and effectiveness of the provider's heuristics without negatively impacting the overall efficacy of these heuristics relative to the provider's user base as whole.

Figure 5:
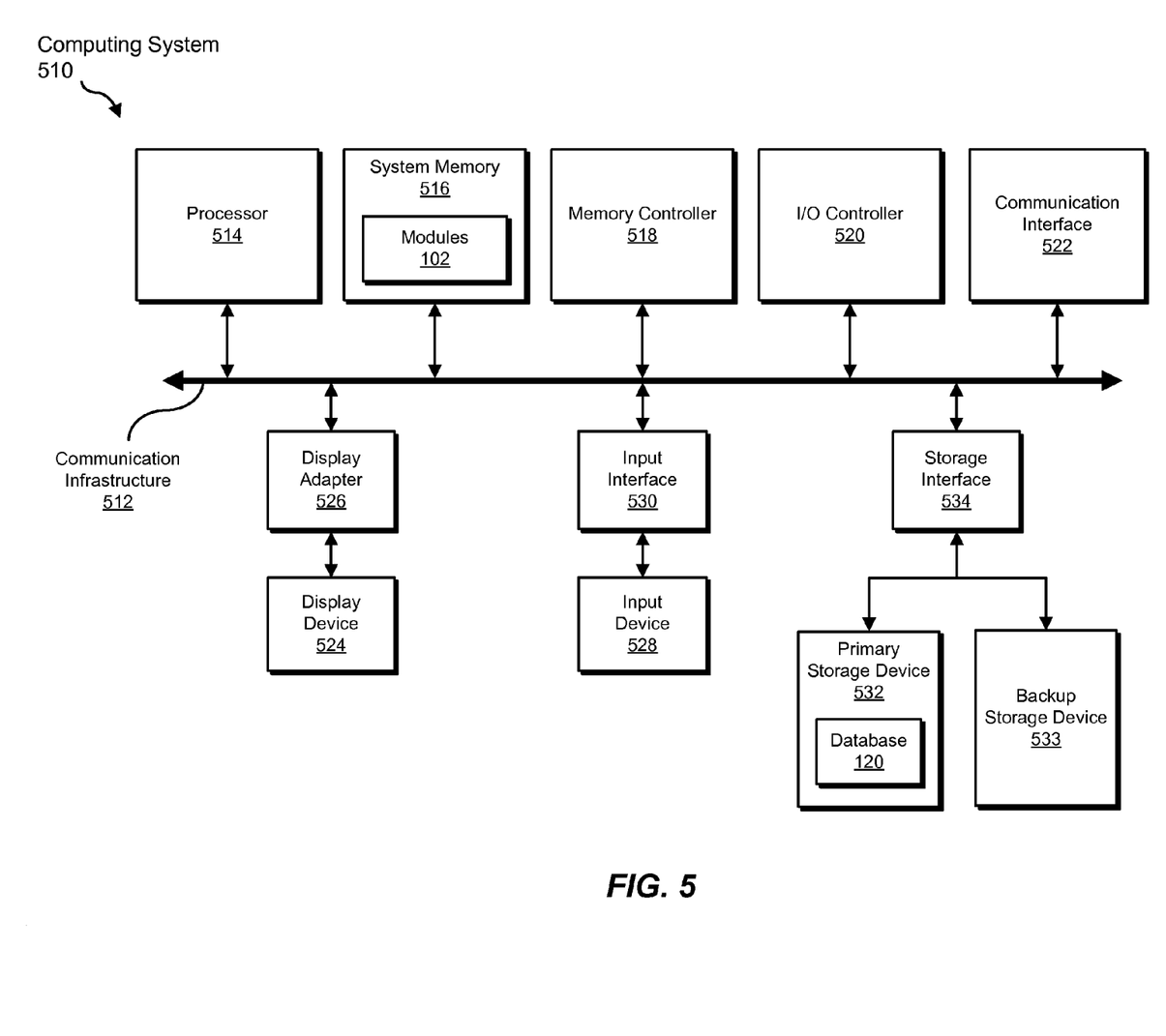
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, applying, determining, lowering, excluding, allowing, prompting, and performing steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller may perform and/or be a means for performing, either alone or in combination with other elements, one or more of the steps or features described and/or illustrated herein, such as identifying, applying, determining, lowering, excluding, allowing, prompting, and performing.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, applying, determining, lowering, excluding, allowing, prompting, and performing steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, applying, determining, lowering, excluding, allowing, prompting, and performing steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, applying, determining, lowering, excluding, allowing, prompting, and performing steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, applying, determining, lowering, excluding, allowing, prompting, and performing steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
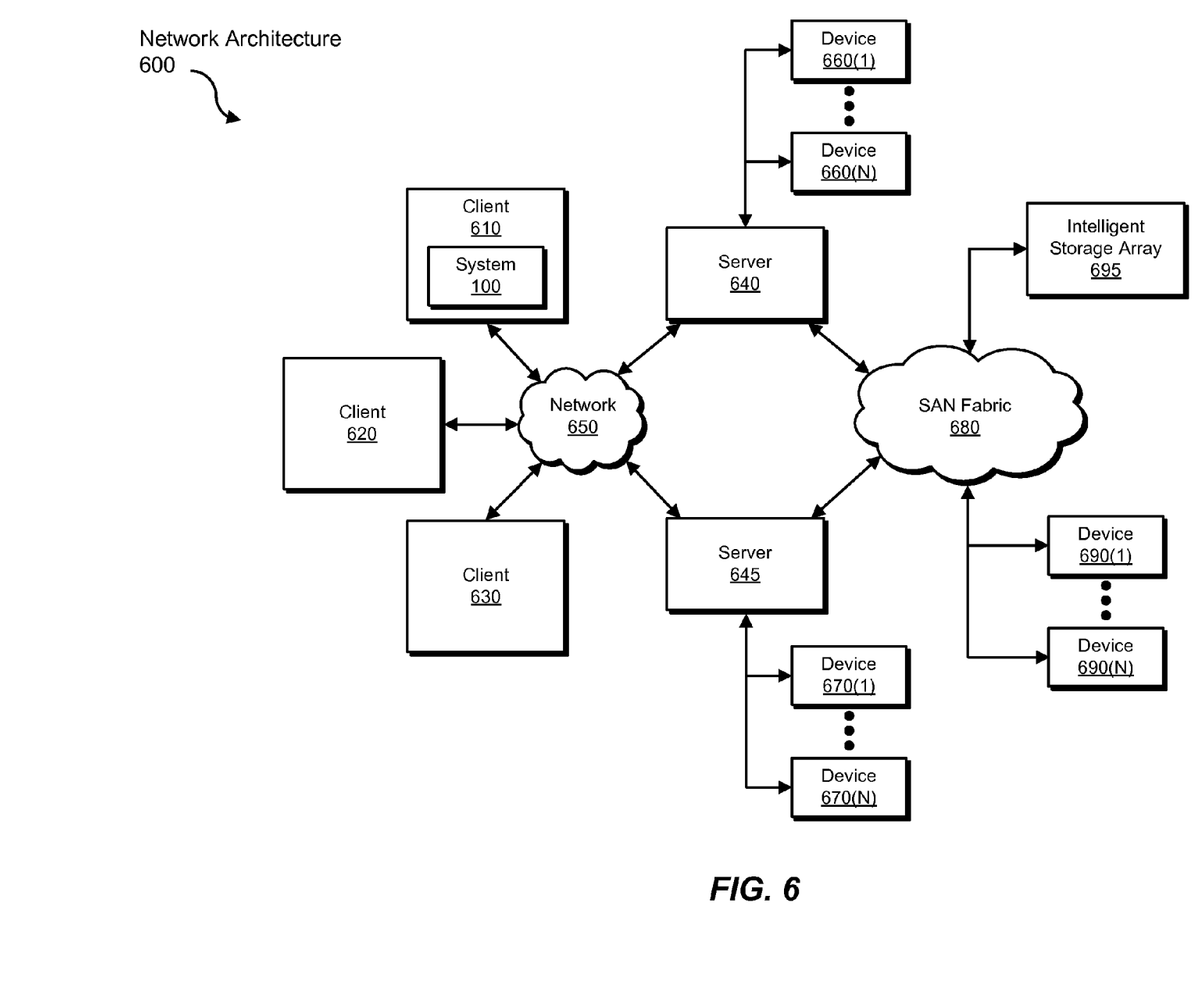
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, applying, determining, lowering, excluding, allowing, prompting, and performing steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for user-specific tuning of classification heuristics. In one example, such a method may include: 1) identifying a trusted software component on a computing device that has been excluded from analysis by a classification heuristic, 2) applying the classification heuristic to the trusted software component, 3) determining that the classification heuristic incorrectly classified the trusted software component, and then 4) lowering a confidence score associated with the classification heuristic.

In some examples, determining that the classification heuristic incorrectly classified the trusted software component may include identifying an attribute of the trusted software component that resulted in the incorrect classification. In this example, lowering the confidence score associated with the classification heuristic may include lowering a confidence score associated with at least one function of the classification heuristic that involves the identified attribute.

In one example, lowering the confidence score associated with the classification heuristic may include: 1) identifying a function of the classification heuristic that resulted in the incorrect classification and then 2) lowering a confidence score associated with the function that resulted in the incorrect classification. In this example, lowering the confidence score associated with the function that resulted in the incorrect classification may include excluding the function that resulted in the incorrect classification from the classification heuristic.

In some examples, the classification heuristic may include a decision tree and lowering the confidence score associated with the classification heuristic may include: 1) identifying a branch configuration of the decision tree that resulted in the incorrect classification and then 2) lowering a confidence score associated with the branch configuration that resulted in the incorrect classification. In this example, lowering the confidence score associated with the branch configuration that resulted in the incorrect classification may include excluding the branch configuration that resulted in the incorrect classification from the decision tree. The branch configuration may include a single branch or a sequence of at least two branches.

In one example, the method may also include automatically allowing the trusted software component to execute and/or prompting a user of the computing device to allow the trusted software component to execute. The method may also include, prior to lowering the confidence score, determining that the confidence score exceeds a predetermined threshold.

The trusted software component may include a digitally signed software component and/or a software component that originated from a trusted source. In some examples, the computing device may perform each step of the method. In addition, in some examples each step of the method may be performed by a low-priority background process on the computing device.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, confidence-adjustment module 110 may transform various characteristics and/or properties of computing device 202(1) by modifying confidence scores 122 stored in database 120 of computing device 202(1).

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for user-specific tuning of classification heuristics, at least a portion of the method being performed by an end user's computing device comprising at least one processor, the method comprising:
    identifying a classification heuristic deployed on the end user's computing device, wherein the classification heuristic is designed to analyze software components for malware;
    identifying a confidence score associated with the classification heuristic;
    tuning the classification heuristic for the end user post-deployment by:
        identifying a trusted software component on the end user's computing device that has been excluded from being analyzed for malware by the classification heuristic due to the trusted software component's trusted status;
        causing the classification heuristic to perform a malware analysis on the trusted software component;
        after the classification heuristic has performed the malware analysis on the trusted software component, determining that the classification heuristic incorrectly classified the trusted software component as untrustworthy;
        in response to determining that the classification heuristic incorrectly classified the trusted software component as untrustworthy, lowering the confidence score associated with the classification heuristic.

2. The method of claim 1, wherein:
    determining that the classification heuristic incorrectly classified the trusted software component comprises identifying an attribute of the trusted software component that resulted in the incorrect classification;
    lowering the confidence score associated with the classification heuristic comprises lowering a confidence score associated with at least one function of the classification heuristic that involves the identified attribute.

3. The method of claim 1, wherein lowering the confidence score associated with the classification heuristic comprises:
    identifying a function of the classification heuristic that resulted in the incorrect classification;
    lowering a confidence score associated with the function that resulted in the incorrect classification.

4. The method of claim 3, wherein lowering the confidence score associated with the function that resulted in the incorrect classification comprises excluding the function that resulted in the incorrect classification from the classification heuristic.

5. The method of claim 1, wherein the classification heuristic comprises a decision tree and lowering the confidence score associated with the classification heuristic comprises:
    identifying a branch configuration of the decision tree that resulted in the incorrect classification;
    lowering a confidence score associated with the branch configuration that resulted in the incorrect classification.

6. The method of claim 5, wherein lowering the confidence score associated with the branch configuration that resulted in the incorrect classification comprises excluding the branch configuration that resulted in the incorrect classification from the decision tree.

7. The method of claim 5, wherein the branch configuration comprises at least one of:
    a single branch;
    a sequence of at least two branches.

8. The method of claim 1, further comprising at least one of:
    automatically allowing the trusted software component to execute;
    prompting the end user to allow the trusted software component to execute.

9. The method of claim 1, further comprising, prior to lowering the confidence score, determining that the confidence score associated with the classification heuristic exceeds a predetermined threshold.

10. The method of claim 1, wherein the trusted software component comprises at least one of:
    a digitally signed software component;
    a software component that originated from a trusted source.

11. The method of claim 1, wherein the end user's computing device performs each step of the method.

12. The method of claim 1, wherein each step of the method is performed by a low-priority background process on the end user's computing device.

13. A system for user-specific tuning of classification heuristics, the system comprising:
    an identification module programmed to:
        identify a classification heuristic deployed on an end user's computing device, wherein the classification heuristic is designed to analyze software components for malware;
        identify a confidence score associated with the classification heuristic;
        identify a trusted software component on the end user's computing device that has been excluded from being analyzed for malware by the classification heuristic due to the trusted software component's trusted status;
    a heuristic-application module, a classification-analysis module, and a confidence-adjustment module programmed to tune the classification heuristic for the end user post-deployment by:
        causing the classification heuristic to perform a malware analysis on the trusted software component;
        after the classification heuristic has performed the malware analysis on the trusted software component, determining that the classification heuristic incorrectly classified the trusted software component as untrustworthy;

in response to determining that the classification heuristic incorrectly classified the trusted software component as untrustworthy, lowering the confidence score associated with the classification heuristic;

at least one processor configured to execute the identification module, the heuristic-application module, the classification-analysis module, and the confidence-adjustment module.

14. The system of claim 13, wherein:

the classification-analysis module determines that the classification heuristic incorrectly classified the trusted software component by identifying an attribute of the trusted software component that resulted in the incorrect classification;

the confidence-adjustment module lowers the confidence score associated with the classification heuristic by lowering a confidence score associated with at least one function of the classification heuristic that involves the identified attribute.

15. The system of claim 13, wherein the confidence-adjustment module lowers the confidence score associated with the classification heuristic by:

identifying a function of the classification heuristic that resulted in the incorrect classification;

lowering a confidence score associated with the function that resulted in the incorrect classification.

16. The system of claim 15, wherein the confidence-adjustment module lowers the confidence score associated with the function that resulted in the incorrect classification by excluding the function that resulted in the incorrect classification from the classification heuristic.

17. The system of claim 13, wherein the heuristic-application module is further programmed to:

automatically allow the trusted software component to execute;

prompt the end user to allow the trusted software component to execute.

18. The system of claim 13, wherein the confidence-adjustment module is further programmed to determine, prior to lowering the confidence score, that the confidence score associated with the classification heuristic exceeds a predetermined threshold.

19. The system of claim 13, wherein the processor executes the identification module, the heuristic-application module, the classification-analysis module, and the confidence-adjustment module in a low-priority background process on the system.

20. A non-transitory computer-readable medium comprising computer-executable instructions that, when executed by at least one processor of an end user's computing device, cause the end user's computing device to:

identify a classification heuristic deployed on the end user's computing device, wherein the classification heuristic is designed to analyze software components for malware;

identify a confidence score associated with the classification heuristic;

tune the classification heuristic for the end user post-deployment by:

identifying a trusted software component on the end user's computing device that has been excluded from being analyzed for malware by the classification heuristic due to the trusted software component's trusted status;

causing the classification heuristic to perform a malware analysis on the trusted software component;

after the classification heuristic has performed the malware analysis on the trusted software component, determining that the classification heuristic incorrectly classified the trusted software component as untrustworthy;

in response to determining that the classification heuristic incorrectly classified the trusted software component as untrustworthy, lowering the confidence score associated with the classification heuristic.

* * * * *